(12) United States Patent
Shang et al.

(10) Patent No.: US 11,947,633 B2
(45) Date of Patent: Apr. 2, 2024

(54) OVERSAMPLING FOR IMBALANCED TEST DATA

(71) Applicant: Verizon Media Inc., New York, NY (US)

(72) Inventors: Hongwei Shang, Sunnyvale, CA (US); Jean-Marc Langlois, Menlo Park, CA (US); Kostas Tsioutsiouliklis, Saratoga, CA (US); Changsung Kang, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 716 days.

(21) Appl. No.: 17/107,574

(22) Filed: Nov. 30, 2020

(65) Prior Publication Data

US 2022/0172007 A1 Jun. 2, 2022

(51) Int. Cl.
| | | |
|---|---|---|
| G06F 18/2413 | (2023.01) | |
| G06F 11/07 | (2006.01) | |
| G06F 18/214 | (2023.01) | |
| G06F 18/2415 | (2023.01) | |
| G06N 20/00 | (2019.01) | |

(52) U.S. Cl.
CPC ...... *G06F 18/24137* (2023.01); *G06F 11/076* (2013.01); *G06F 18/214* (2023.01); *G06F 18/24155* (2023.01)

(58) Field of Classification Search
None
See application file for complete search history.

(56) References Cited

U.S. PATENT DOCUMENTS

| | | | | |
|---|---|---|---|---|
| 11,481,672 B2 * | 10/2022 | Pham | ................ | G06F 16/24578 |
| 11,631,029 B2 * | 4/2023 | Puri | ....................... | G06N 20/00 |
| | | | | 706/12 |
| 11,663,466 B2 * | 5/2023 | Abad | ..................... | G06N 3/045 |
| | | | | 706/20 |
| 11,676,060 B2 * | 6/2023 | Roychowdhury | ..... | G06N 20/00 |
| | | | | 706/12 |
| 2022/0083900 A1 * | 3/2022 | Khanna | .................... | G06F 17/18 |
| 2022/0199073 A1 * | 6/2022 | Ramadas | ............... | G10L 15/197 |
| 2022/0415018 A1 * | 12/2022 | Miyagawa | ........... | G06V 10/764 |

FOREIGN PATENT DOCUMENTS

| | | | | | |
|---|---|---|---|---|---|
| CN | 107784325 | A | * | 3/2018 | ........... G06K 9/6256 |
| CN | 109711474 | B | * | 1/2023 | |
| EP | 3876193 | A1 | * | 9/2021 | ............. G06K 9/628 |
| GB | 2538391 | A | * | 11/2016 | ............. G06N 3/126 |
| WO | WO-2020188425 | A1 | * | 9/2020 | |

* cited by examiner

*Primary Examiner* — Mohammed Rachedine
(74) *Attorney, Agent, or Firm* — Cooper Legal Group LLC

(57) ABSTRACT

One or more computing devices, systems, and/or methods for oversampling for imbalanced test data are provided. A classifier is configured to classify data points as either belonging to a first class or a second class. A determination may be made that the first class and the second class are imbalanced where a first number of data points estimated to be part of the first class is a threshold amount less than a second number of data points estimated to be part of the second class. An oversampling ratio is determined for the first class. The oversampling ratio is used to select a sample set of data points for editorial labeling, where the sampling set of data points comprises a total number of data points below a threshold amount.

17 Claims, 8 Drawing Sheets

OVERSAMPLING FOR IMBALANCED TEST DATA

BACKGROUND

Machine learning algorithms may be utilized as classifiers, such as a binary classifier, to perform various tasks. In an example, a classifier may be configured to evaluate images as input, and output predictions as to whether the images depict a particular object (e.g., whether images depict a traffic accident or not). Classifiers may be utilized for a variety of other tasks, such as determining whether a user would watch a video until completion, whether a user would want to purchase a particular product, determining whether emails are spam or not spam, etc.

A classifier may be trained using labeled test data. In an example, humans may have labeled the labeled test data with ground truth labels assumed to be correct/accurate, such as where the humans manually read emails and label the emails as either being spam or not spam. The amount of manual effort, labeling and training time, and cost may be prohibitively expensive to obtain a large enough set of labeled test data for training a classifier to near perfection. Thus, the classifier may have a particular precision and recall with respect to how accurately the classifier can make predictions. Precision of a classifier corresponds to a percentage of predictions made by the classifier that were correct (e.g., how many emails predicted to be spam were in fact spam). For example, if the classifier predicts that 10 out of 100 emails are spam and ground truth labels by human labelers specify that there is actually only 8 emails that are spam (e.g., 8 spam emails is assumed to be correct/accurate), then the precision of the classifier is 80%. In this way, precision corresponds to a ratio of the correct labeled number of spam emails over the number of spam emails identified by the classifier. Recall of a classifier corresponds to how many of the ground truth labeled spam emails that the classifier identified. For example, an image depicts 10 cats and 12 dogs. The classifier identifies 8 dogs in the image, however, 5 are actually dogs and 3 are cats (e.g., the classifier incorrectly identified 3 cats as dogs). The recall of the classifier would be 5/12, which corresponds to a ratio of the number of correctly identified dogs over the total number of dogs. In this example, precision would be 5/8, which corresponds to the 5 correctly identified dogs out of the 8 dogs the classifier identified.

SUMMARY

In accordance with the present disclosure, one or more computing devices and/or methods for oversampling for imbalanced test data are provided. In particular, the techniques provided herein are directed to determining confidences that an estimated precision metric and an estimated recall metric for a classifier are accurate. These confidences correspond to a recall confidence interval corresponding to a confidence that the estimated recall metric is correct (e.g., a margin of error regarding the accuracy of the estimated recall metric, such as a plus or minus 5.1% margin of error that an estimated recall metric is correct). A predicted confidence interval corresponds to a confidence that the estimated precision metric is correct (e.g., a margin of error regarding the accuracy of the estimated precision metric, such as a plus or minus 3.2% margin of error that an estimated precision metric of 78% is correct).

In an embodiment, a classifier may be configured to classify data points as either belonging to a first class or a second class. For example, the first class may correspond to emails that are human written, and the second class may correspond to emails that are not human written, such as being machine generated. It may be appreciated that any type of classes may be evaluated by the classifier, such as a first class corresponding to images depicting dogs and a second class corresponding to images that do not depict dogs, a first class corresponding to users that would watch a video and a second class corresponding to user that would not watch the video. In an example, the classifier may have been trained to predict whether an email is part of the first class of human written emails or part of the second class of non-human written emails. An estimated precision metric of the classifier may be determined based upon the training of the classifier. Also, an estimated recall metric of the classifier may be determined based upon the training of the classifier.

After the classifier has been deployed, the classifier may be monitored and evaluated to determine confidences (confidence intervals) that the estimated precision metric and estimated recall metrics are correct, which may correspond to margins of error for the estimated precision metric and the estimated recall metric. Accordingly, a set of data points (e.g., 1 million emails) may be classified by the classifier as either being part of the first class or being part of the second class. These predicted classifications may be relatively accurate but are not 100% accurate (e.g., editorial labeling of the emails by human editors/labels may be assumed to be 100% accurate/correct) because the classifier may make some incorrect predictions. Thus, a sample set of data points from the set of data points may be selected and provided for editorial labeling in order to accurately determine the confidences (confidence intervals) that the estimated precision and estimated recall metrics are correct. However, the number of data points within the sample set of data points may be constrained to a threshold number of data points because editorial labeling by humans can be time consuming, expensive, and consume a large amount of manual effort. Thus, it may be desirable to reduce (minimize) the number of data points within the sample set of data points, while still being able to accurately determine the confidences (confidence intervals) that the estimated precision and estimated recall metrics are correct. Thus, the sample set of data points is a subset of the entire set of data points (e.g., 1,000 out of the 1 million emails). In this way, the size of the sample set of data points may be reduced (minimized), given certain constraints.

If the first class is a threshold amount smaller than the second class or vice versa (e.g., the classes are imbalanced where 2,000 emails were predicted to be human written and 998,000 emails were predicted to be machine generated), then taking a random sample of data points would create an imbalanced sample set of data points that would not be helpful for determining the confidences (confidence intervals) that the estimated precision and estimated recall metrics are correct because too few data points would be from the first class.

Accordingly, as provided herein, an oversampling ratio may be determined for the first class based upon a determination that the first class and the second class are imbalanced where a first number of data points estimated to be part of the first class is a threshold amount less than a second number of data points estimated to be part of the second class (or vice versa). In an example, the oversampling ratio may be based upon the estimated precision for the classifier, an estimated recall for the classifier, an imbalance ratio between the first class and the second class (e.g., a ratio of the first number of data points within the first class compared to the second number of data points within the second class), and/or other criteria such as a production specification (e.g., a specification of how small the margins of error (confidence intervals) are to be for the precision metric and the recall metrics, a budget constraint on a total number of data samples to use for editorial labeling, etc.), an goal to minimize the number of sampled data points for subsequent editorial review, etc. The oversampling ratio may be utilized to select a sample set of data points for editorial labeling. The sample set of data points may comprise a selected number of data points estimated to be part of the first class by the classifier and a selected number of data points estimated to be part of the second class by the classifier. The total number of data points within the sample set of data points may be selected to be below a threshold amount of data points, such as to minimize a number of data points within the sample set of data points. In this way the sample set of data points may be provided for editorial labeling, and used to determine confidences (confidence intervals) that the estimated precision and estimated recall metrics for the classifier are correct.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
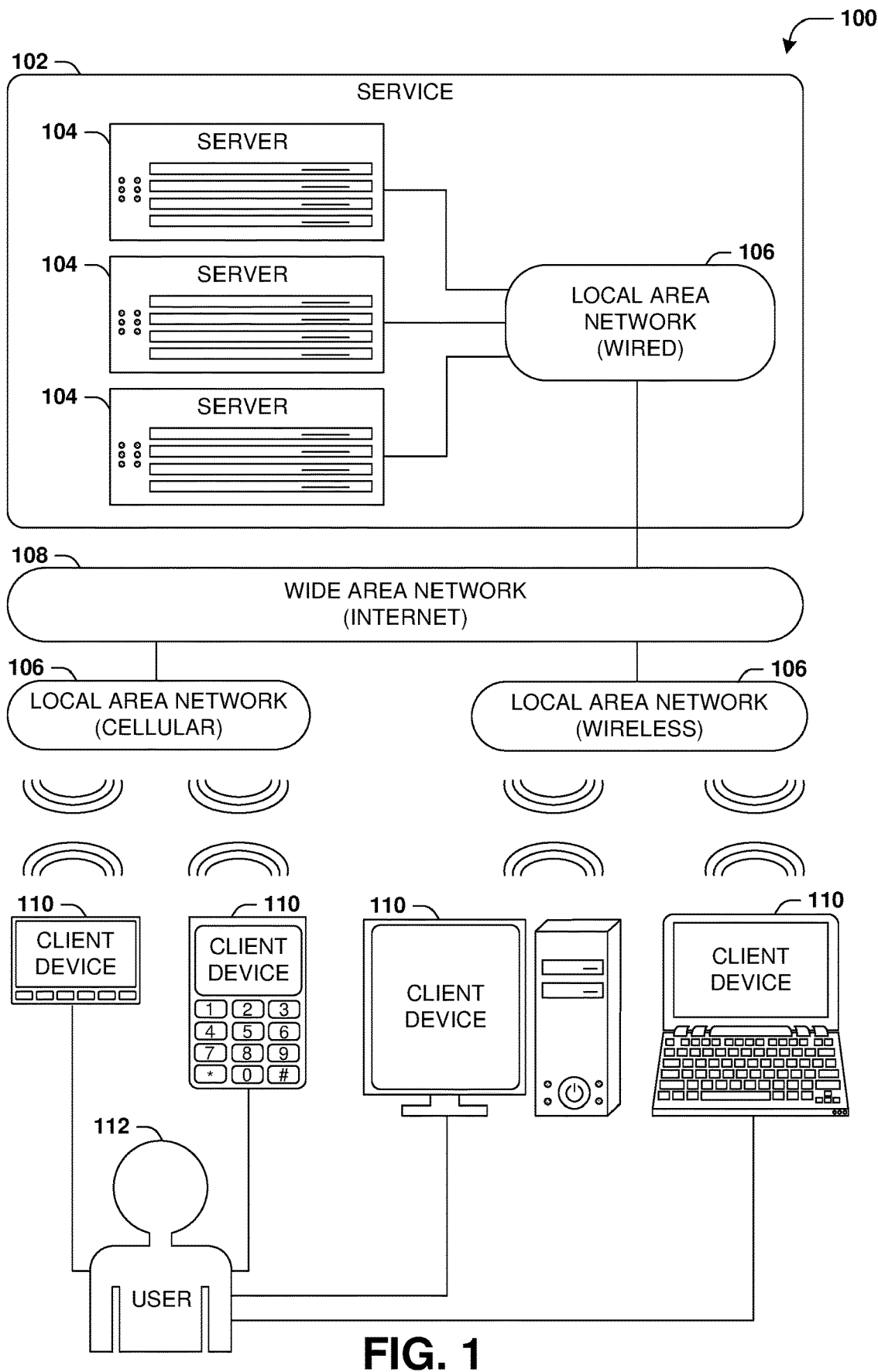
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
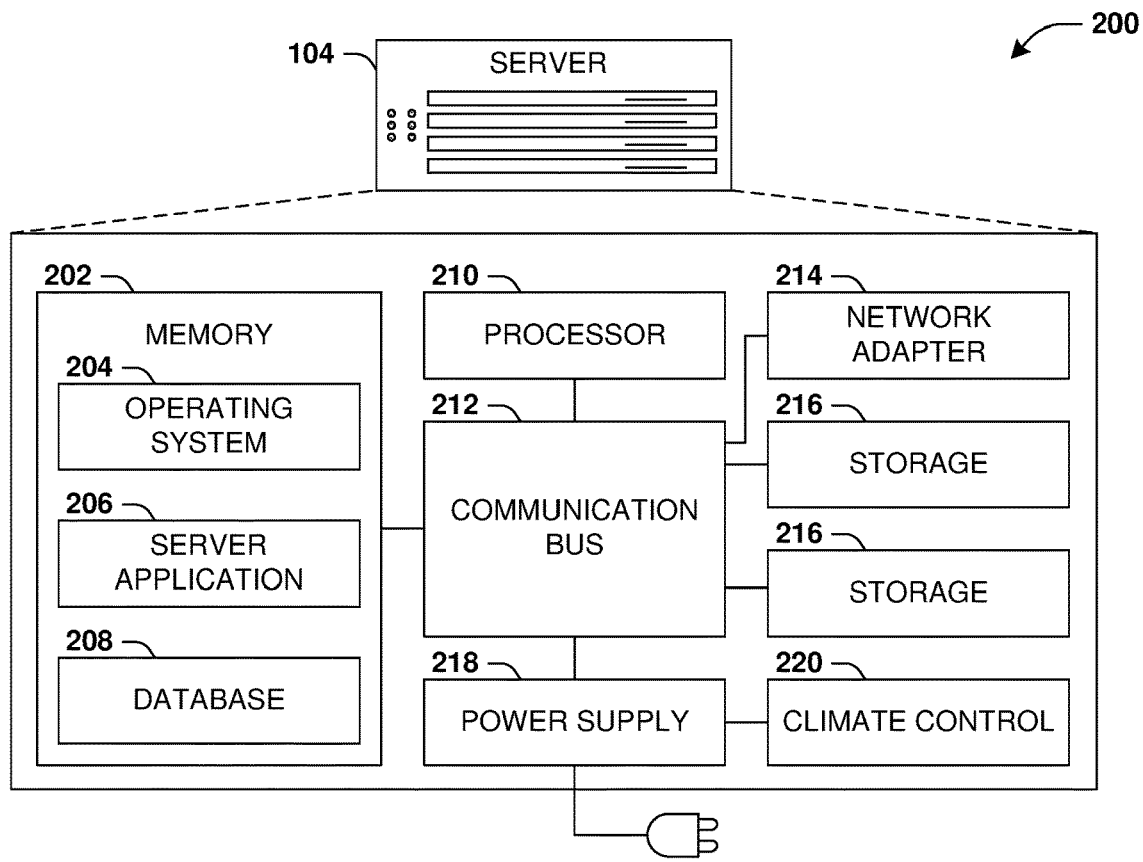
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
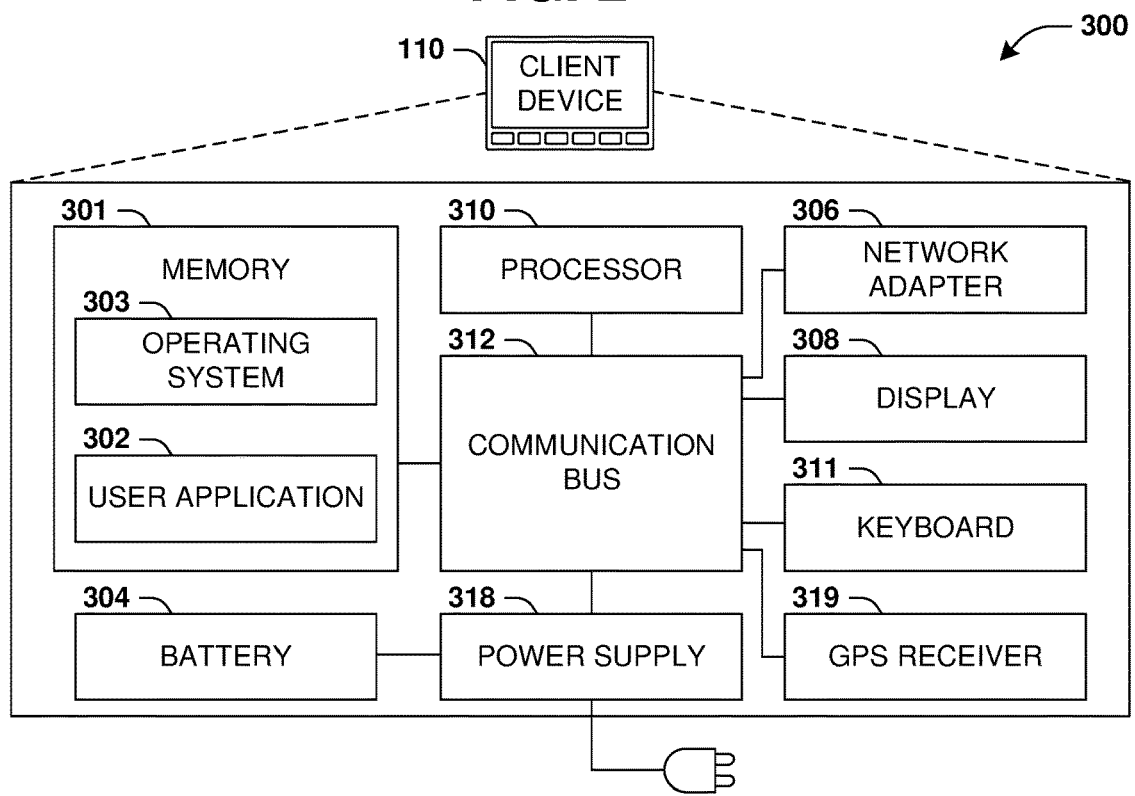
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for oversampling for imbalanced test data are provided. Classifiers may be trained to perform various tasks, such as to identify emails as spam, identify objects in images, determine whether a user will have an interest in a good or service, etc. In an example of a classifier, a binary classifier may be trained to classify elements of a set into two classes/groups based upon a classification rule. For example, the binary classifier may be trained to output whether an email is spam as a first class or not spam as a second class. In this way, classifiers may be trained to perform a wide variety of tasks.

During training of a classifier, labeled training data may be used to train the classifier. The labeled training data points may be labeled by human editors. For example, human editors (human labelers) may open emails, read the emails, and then label the emails as either being spam or not spam using ground truth labels. Using human editors for labeling data points to create the labeled training data points may be expensive and time consuming, which limits the total amount of labeled training data points that may be used to train the classifier because it can become prohibitively expensive. During training, the classifier processes the labeled training data that has ground truth labels that were labeled by the human editors and are assumed to be correct. Based upon how well the classifier performs (e.g., how many times the classifier outputs a classification that matched a ground truth label), parameters of the classifier may be adjusted during training. In this way, the classifier may be trained to more accurately output predictions, such as whether data points belong to a first class (e.g., spam) or to a second class (e.g., not spam).

A variety of metrics may be created and tracked during the training of the classifier for specifying how well the classifier performs. A precision metric and a recall metric are two such metrics, which may be determined as an estimated precision metric and an estimated recall metric for the classifier determined based upon the training of the classifier. That is, the classifier may have a particular estimated precision and recall with respect to how accurately the classifier made predictions. Precision of a classifier corresponds to a percentage of predictions by the classifier that were correct (e.g., how many emails predicted to be spam were in fact spam). For example, if the classifier predicts that 10 out of 100 emails are spam and ground truth labels by human editors specify that there is actually only 7 emails that are spam (e.g., 7 spam emails is assumed to be correct/accurate), then the precision of the classifier is 70%. In this way, the estimated precision metric corresponds to a ratio of the correct labeled number of spam emails over the number of spam emails identified by the classifier. Recall of a classifier corresponds to how many of the ground truth labeled spam emails that the classifier identified. In an example where the classifier is trained to detect males within images, the classifier may process an image actually depicting 10 females and 12 males. The classifier identifies 8 males in the image, however, 5 of the identified males are in fact males and 3 of the identified males are actually females (e.g., the classifier incorrectly identified 3 females as males). The estimate recall metric of the classifier would be 5/12, which corresponds to a ratio of the number of correctly identified 5 males over the total number of 12 males. In this example, the estimated precision metric would be 5/8, which corresponds to the 5 correctly identified males out of the 8 males the classifier identified.

Once the classifier has been trained on the labeled training data, the classifier may be deployed for real world classification of data points. For example, an email service may deploy and utilize the classifier to evaluate and mark emails as spam or not spam before the emails are delivered to inboxes of user accounts of the email service. Over time, the accuracy of the classifier may change due to various circumstances, such as where the data points being classified by the classifier differ from data points that the classifier was trained on, a bug may be introduced that causes degraded performance of the classifier, etc. Thus, the estimated precision metric and the estimated recall metric that were determined during training may be incorrect (e.g., have margins of error that are to be identified by calculating confidence intervals for the estimated precision metric and the estimated recall metric) because the accuracy of the classifier may increase or decrease over time for various reasons.

A precision confidence interval corresponds to a margin of error (e.g., plus or minus 2.2%) around the estimated precision metric (e.g., 86% precision with plus or minus 2.2% margin of error). A recall confidence interval corresponds to a margin of error (e.g., plus or minus 1.3%) around the estimated recall metric (e.g., 74% precision with plus or minus 1.3% margin of error). The precision confidence interval and the recall confidence interval correspond to a confidence that the estimated precision metric and the estimated recall metric are correct. The narrower the precision confidence interval (margin of error) for the classifier, the more confidence there is that the estimated precision metric for the classifier is correct. The wider the precision confidence interval (margin of error) for the classifier, the less confidence there is that the estimated precision metric for the classifier is correct. Similarly, the narrower the recall confidence interval (margin of error) for the classifier, the more confidence there is that the estimated recall metric for the classifier is correct. The wider the recall confidence interval (margin of error) for the classifier, the less confidence there is that the estimated recall metric for the classifier is correct.

Because the classifier's precision and recall can change over time (e.g., a classifier could have an estimated recall metric of 80% from training, but has a 40% recall after deployment while classifying emails for the email service over time) and it may be beneficial to know the precision and recall of the classifier because the classifier is actively classifying emails for the email service, the precision confidence interval and the recall confidence interval may be calculated so that the classifier is not inaccurately classifying emails and performing worse than initially estimated.

In order to calculate the precision confidence interval and the recall confidence interval, a sample set of data points may be identified for editorial labeling by human editors to determine a current precision and recall of classifier. Because editorial labeling is time consuming, expensive, and consumes a lot of manual human effort, a size of the sample set of data points may be constrained to a threshold size, such as a minimized size (e.g., a budget for editorial labeling may constrain the sample set of data points to 1,000 emails even though there is 1 million emails available). Accordingly, a subset of available data points may be selected as the sample set of data points. The available data points may have been classified by the classifier as either being part of a first class (non-spam emails) or part of a second class (spam emails). The classifications may be relatively accurate, but are not guaranteed to be correct/accurate compared to if the data points were editorially labeled by human editors.

In some instances, the available data points may be imbalanced. For example, 3% of the available data points may have been predicted/estimated by the classifier as belonging to a first class of non-spam emails (e.g., 30,000 of the 1 million emails are predicted to be non-spam emails) and 97% of the available data points may have been predicted/estimated to belong to the second class of spam emails (e.g., 970,000 of the 1 million emails are predicted to be spam emails). If a random sample of the available data points is taken as the sample data points, then only about 3% of the sample data points will have non-spam emails from the first class, while about 97% of the sample data points will have spam emails from the second class. If the sample set of data points is restricted (e.g., due to budget constraints) to 1,000 data point emails, then the sample data set of data points may merely comprise around 30 non-spam emails, and the rest of the sample data set of data points may comprise around 970 spam emails. The precision confidence interval and recall confidence interval for the classifier cannot be accurately determined because there is not enough examples of non-spam emails that will be used for editorial labeling used to calculate the precision confidence interval and the recall confidence interval. Additionally, there may be no need for 970 examples of spam emails as a smaller number of spam email examples would be adequate to use for editorial labeling used to calculate the precision confidence interval and the recall confidence interval.

Accordingly, as provided herein, the first class may be oversampled to create a sample set of data points that comprises more data points from the first class compared to if random sampling was performed and less data points from the second class compared to if the random sampling was performed so that the same total number of data points are used in the sample set of data points as if no oversampling was performed. The oversampling may be performed in a manner that still allows the total number of data points within the sample set of data points to be below a threshold (e.g., a minimized sample set of data points; a number of data points constrained to a certain number due to a budget or other constraints). This is achieved by selectively determining how many data points to oversample from the first class using a calculated oversampling ratio.

The oversampling ratio may be calculated based upon various factors and criteria. In an embodiment, the oversampling ratio is calculated based upon the estimated precision metric for the classifier (e.g., the estimated precision metric that was determined during training of the classifier using the labeled training data). In an embodiment, the oversampling ratio is calculated based upon the estimated recall metric for the classifier (e.g., the estimated recall metric that was determined during training of the classifier using the labeled training data). In an embodiment, the oversampling ratio is calculated based upon an imbalance ratio between the first class and the second class. That is, the imbalance ratio may be based upon a ratio of a first number of data points of the first class to a second number of data points of the second class. In an embodiment, the smaller the imbalance ratio (e.g., the larger the second number of data points of the second class compared to the first number of data points of the first class or vice versa), the larger the oversampling ratio. In an embodiment, the oversampling ratio is calculated based upon production specifications. In an example, the production specifications may correspond to an acceptable error margin for the precision of the classifier, an acceptable error margin for the recall of the classifier, a budget constraint for editorial labeling, a constraint on a total number of data points for inclusion within the sample of data points (e.g., a minimum number of data points while still being able accurately determine the recall confidence interval for the estimated recall metric and/or the precision confidence interval for the estimated precision metric by implementing the editorial labeling for the sample set of data points). In this way, the oversampling ratio is used to select data points for inclusion within the sample set of data points that are provided for editorial labeling so that the results of the editorial labeling can be used to determine the recall confidence interval for the estimated precision metric and/or the precision confidence interval for the estimated recall metric.

Figure 4:
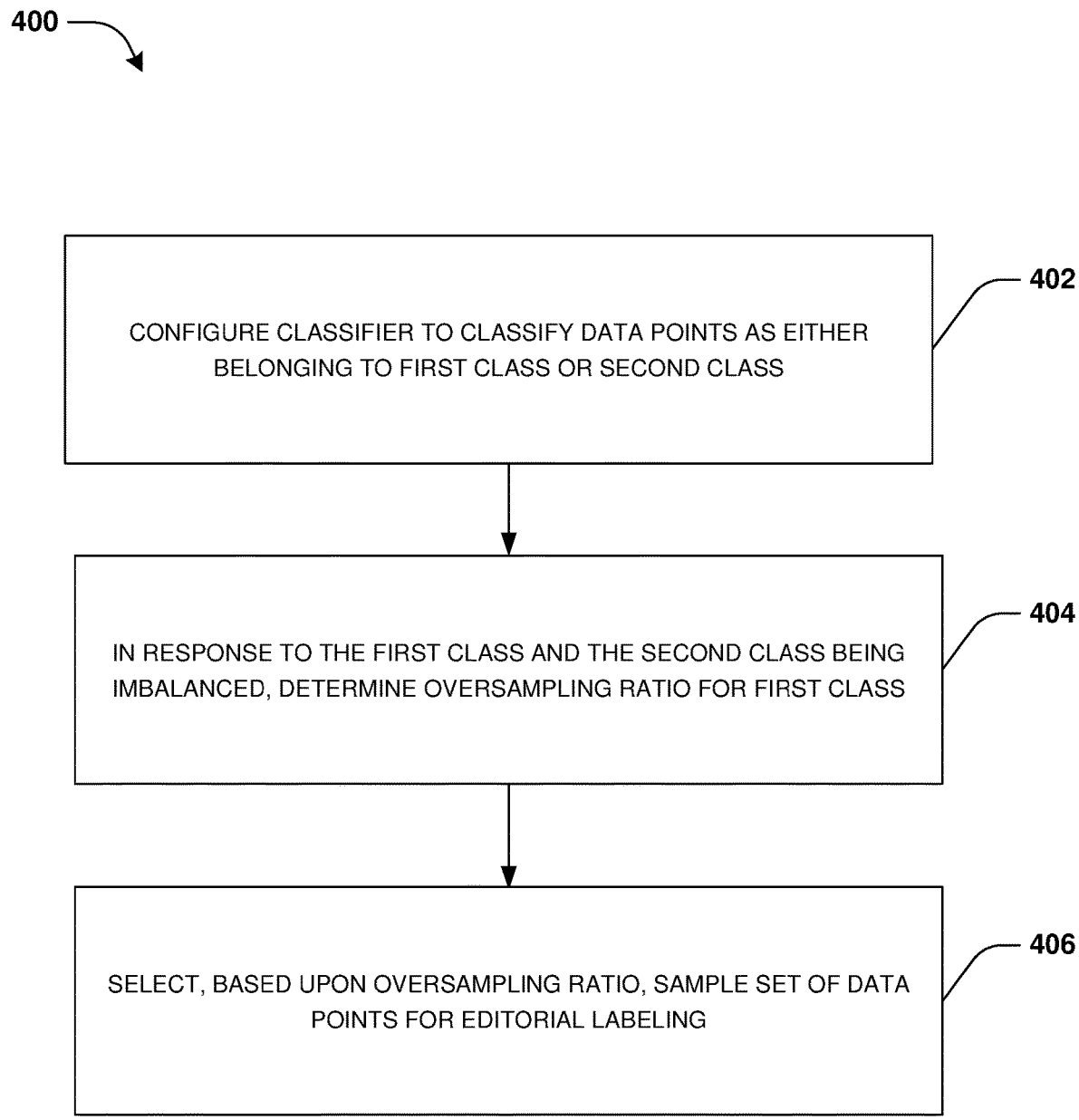
FIG. 4 is a flow chart illustrating an example method for oversampling for imbalanced test data.
Figure 5A:
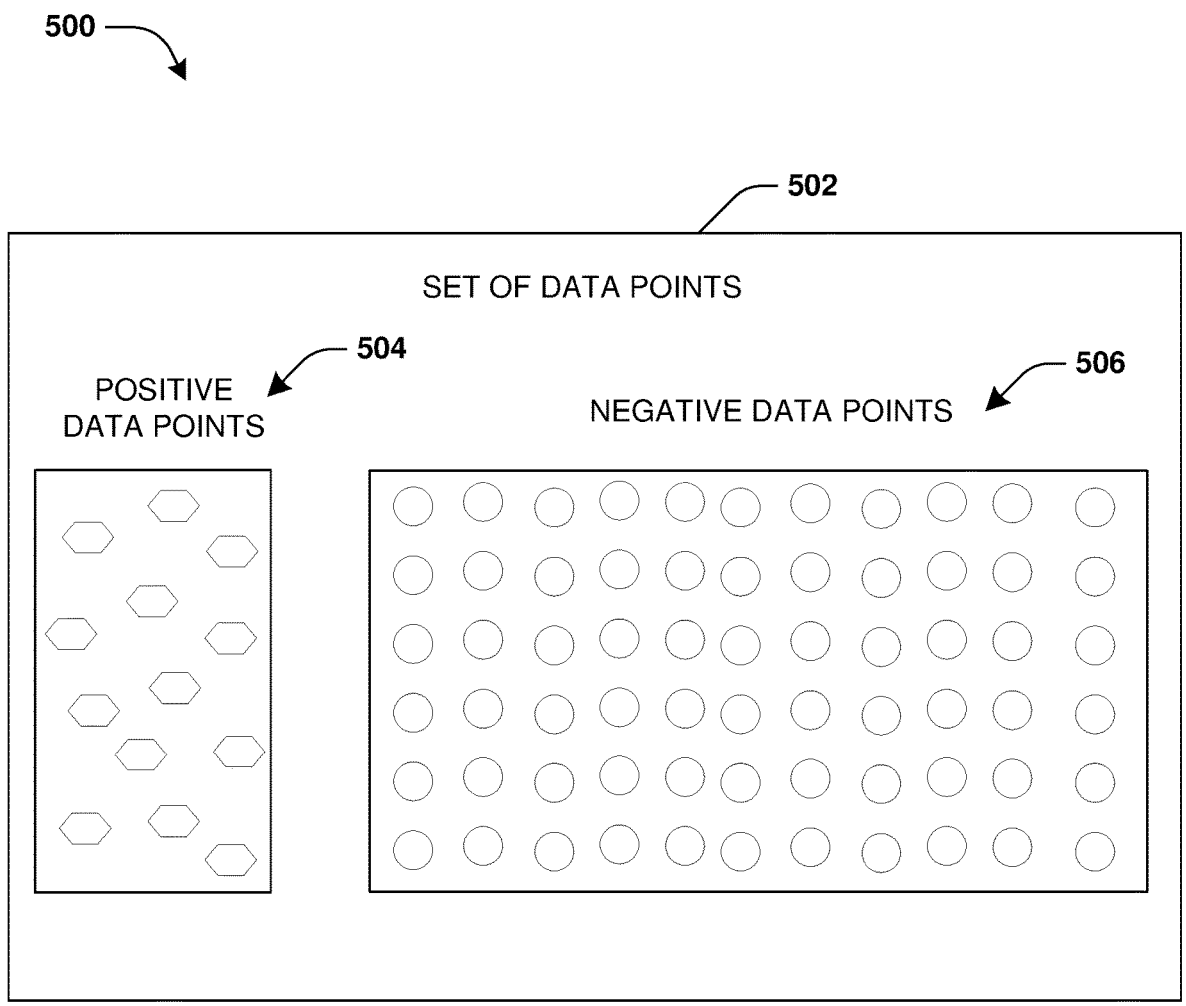
FIG. 5A is a component block diagram illustrating an example system for oversampling for imbalanced test data, where a set of data points is determined to be imbalanced.
Figure 5A:
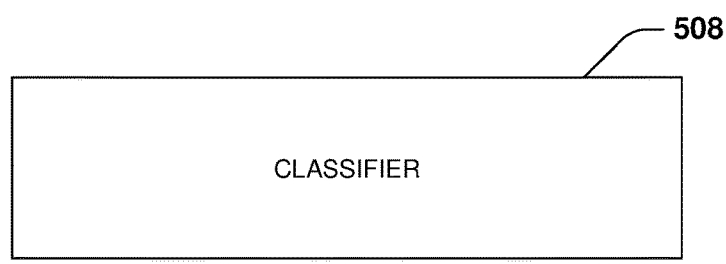

One embodiment of oversampling for imbalanced test data is illustrated by an exemplary method 400 of FIG. 4 and further described in conjunction with system 500 of FIGS. 5A-5D. A classifier 508, as illustrated by FIG. 5A, may have been trained to detect whether an image depicts a pedestrian or does not depict a pedestrian. Images that depict a pedestrian may be part of a first class and images that do not depict pedestrians may be part of a second class, and thus the classifier 508 may classify a set of data points 502 comprising images as either being part of the first class or the second class. The images that the classifier 508 identified as depicting a pedestrian may be referred to as positive data points 504 that are classified into the first class. The images that the classifier 508 identified as not depicting pedestrians may be referred to as negative data points 506 that are classified into the second class. It may be appreciated that the classifier may be configured to classify any type of data points into any types of classes, and image data points and pedestrians is merely used as one example for illustrative purposes.

Figure 5B:
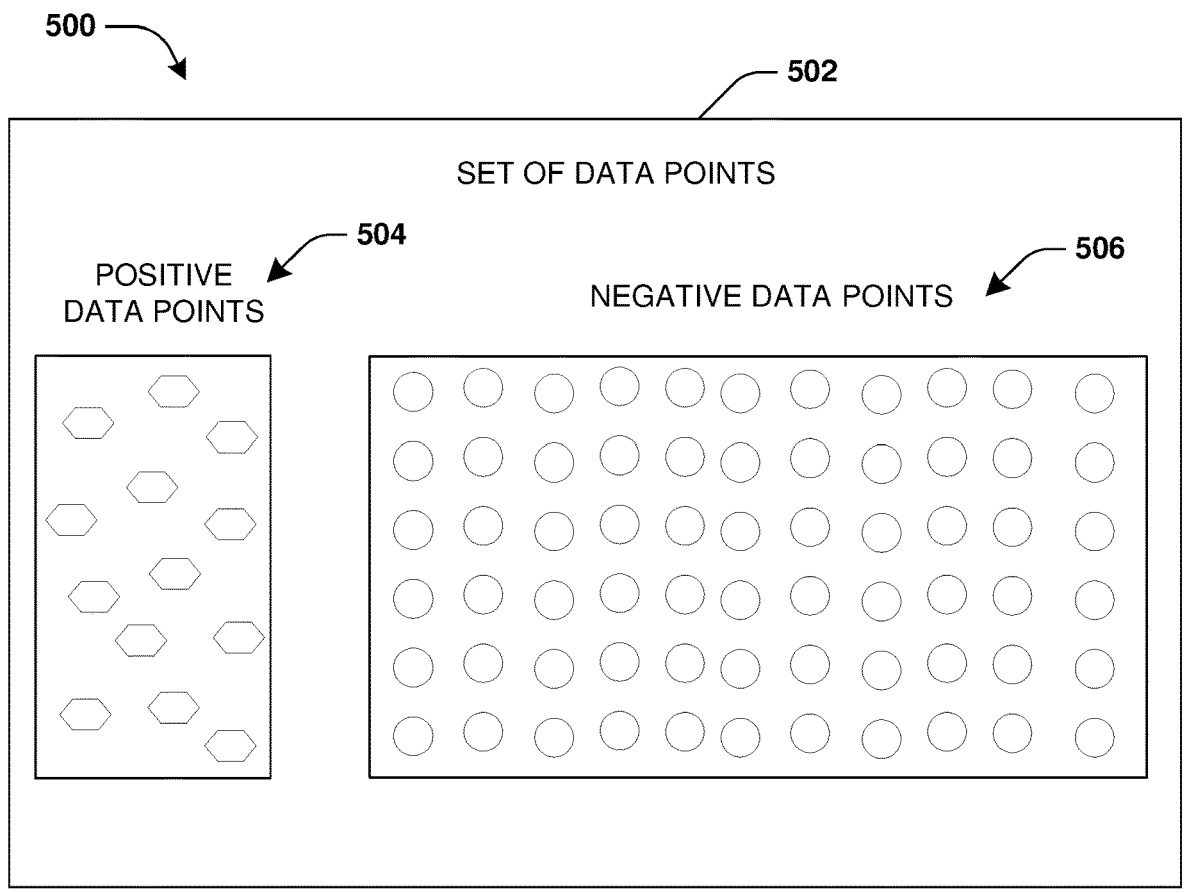
FIG. 5B is a component block diagram illustrating an example system for oversampling for imbalanced test data, where an oversampling ratio is determined.
Figure 5B:
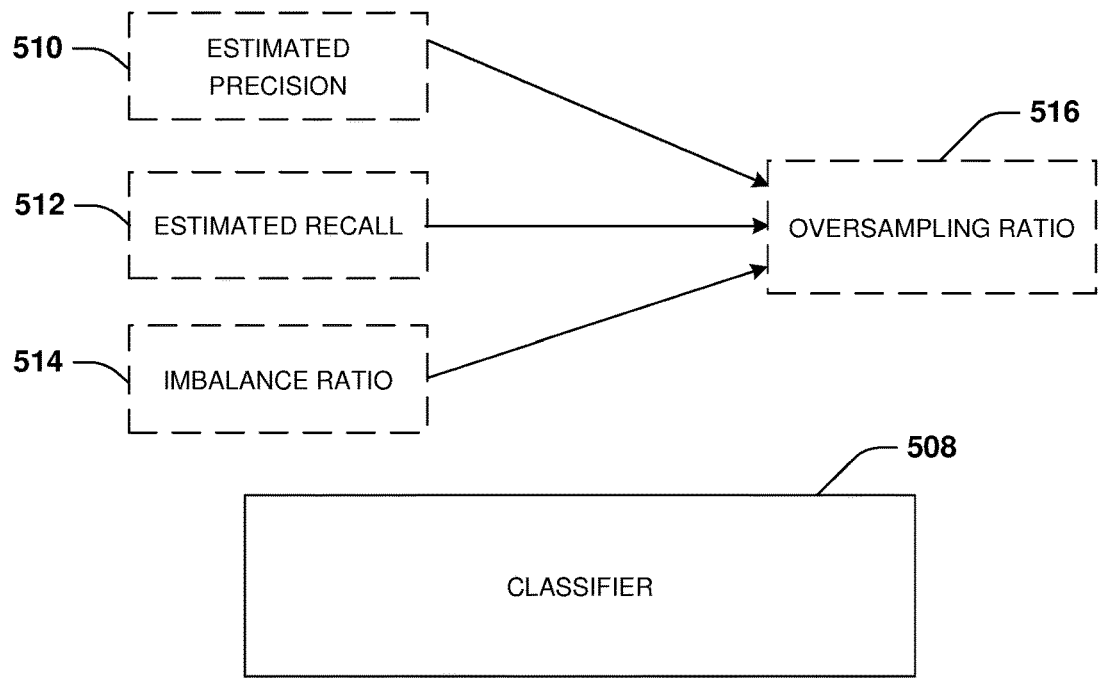

In an embodiment, the classifier 508 may have been trained on labeled training data where human editors labeled images as either being positive data points belonging to the first class of images depicting a pedestrian or negative data points belonging to the second class of images not depicting pedestrians. Based upon the training of the classifier 508, an estimated precision metric 510 may have been calculated based upon a precision of the classifier 508 with respect to the labeled training data that was used to train the classifier 508, as illustrated by FIG. 5B. The estimated precision metric 510 for the classifier 508 corresponds to a percentage of predictions by the classifier 508 that were correct (e.g., how many image that the classifier 508 predicted as depicting a pedestrian in fact depicted a pedestrian). For example, if the classifier predicts that 10 out of 100 images depict a pedestrian and ground truth labels by human labelers specify that there is actually only 8 images depicting pedestrians (e.g., 8 images depicting pedestrians is assumed to be correct/accurate), then the precision of the classifier is 80%. In this way, estimated precision metric corresponds to the ratio of images actually depicting pedestrians over the number of images identified by the classifier 508 as depicting pedestrians.

Based upon the training of the classifier 508, an estimated recall metric 512 may have been calculated based upon a recall of the classifier 508 with respect to the labeled training data that was used to train the classifier 508. The estimated recall metric 512 for the classifier 508 corresponds to how many of the ground truth labeled images depicting pedestrians that the classifier 508 identified. The recall of the classifier 508 may be the ratio of the number of images that the classifier 508 correctly identified as depicting pedestrians over the total number of images actually depicting pedestrians.

In an embodiment, the classifier 508 may be deployed after training. The classifier 508 may be deployed into a production environment for labeling data points (e.g., images) such as the set of data points 502 as either being positive data points 504 of images depicting pedestrians and belonging to the first class or being negative data points 506 of images not depicting pedestrians and thus belonging to the second class (e.g., deployed for real-time classification of images acquired by a traffic monitoring system for monitoring pedestrian traffic). Accordingly, during operation 402 of method 400 of FIG. 4, the classifier 508 is configured to classify the set of data points 502 as either belonging to the first class or the second class.

Because the accuracy of the classifier 508 may change after being deployed after training such as where the classifier 508 is classifying the data points within the set of data points 502, the estimated precision metric 510 and the estimated recall metric 512 may be incorrect because the precision and recall of the classifier 508 may change over time. Accordingly, as provided herein, a sample set of data points from the set of data points 502 may be identified for editorial labeling so that the results of the editorial labeling can be used to determine a precision confidence interval (margin of error) for the estimated precision metric 510 and a recall confidence interval (margin of error) for the estimated recall metric 512. The precision confidence interval may correspond to a confidence that the estimated precision metric 510 is accurate/correct (e.g., a 4.5% plus or minus error margin around the estimated precision metric 510 of 90% precision). The recall confidence interval may correspond to a confidence that the estimated recall metric 512 is accurate/correct (e.g., a 1.1% plus or minus error margin around the estimated recall metric 512 of 78% recall). The sample set of data points may be selected for editorial labeling by using an oversampling ratio 516 calculated based upon various factors.

Accordingly, during operation 404 of method 400 of FIG. 4, the set of data points 502 may be evaluated to determine whether the first class of images classified by the classifier 508 as positive data points 504 of images depicting pedestrians and the second class of images classified by the classifier 508 as negative data points 506 of images not depicting pedestrians are imbalanced or not. In an embodiment, a threshold may be set based upon various factors and/or criteria for determining how many more data points one class is to have compared to the other class before the classes are determined to be imbalanced. In this way, a first number of data points estimated to be the positive data points 504 that are part of the first class (e.g., images classified by the classifier 508 as depicting pedestrians) are compared with a second number of data points estimated to be the negative data points 506 that are part of the second class (e.g., images classified by the classifier 508 as not depicting pedestrians) are compared to see if the first number of positive data points 504 is less than the second number of negative data points 506 by a threshold amount (or vice versa). If the first number of positive data points 504 is not less than the second number of negative data points 506 by the threshold amount (or vice versa), then the set of data points 502 are balanced and oversampling may be skipped, in some embodiments. If the first number of positive data points 504 is less than the second number of negative data points 506 by the threshold amount (or vice versa), then the set of data points 502 are imbalanced and oversampling is to be performed.

In response to a determination that the first number of positive data points 504 is less than the second number of negative data points 506 by the threshold amount (or vice versa), an oversampling ratio 516 for the first class of positive data points 504 corresponding to images that the classifier 508 predicted as depicting a pedestrian is calculated (or vice versa where the oversampling ratio 516 is calculate for the second class of negative data points 506). The oversampling ratio 516 may be calculated based upon a variety of factors and/or criteria. In an embodiment of calculating the oversampling ratio 516, the oversampling ratio 516 is calculated based upon the estimated precision metric 510 for the classifier 508, which may have been identified for the classifier 508 during the training of the classifier 508, for example. In an embodiment of calculating the oversampling ratio 516, the oversampling ratio 516 is calculated based upon the estimated recall metric 512 for the classifier 508, which may have been identified for the classifier 508 during the training of the classifier 508, for example.

In an embodiment of calculating the oversampling ratio 516, the oversampling ratio 516 is calculated based upon an imbalance ratio 514. The imbalance ratio 514 is associated with how imbalanced are the first class of the positive data points 504 estimated/predicted by the classifier 508 as images depicting a pedestrian and the second class of the negative data points 506 estimated/predicted by the classifier 508 as images not depicting pedestrians. For example, the imbalance ratio 514 may be calculated as a ratio of the first number of positive data points 504 to the second number of negative data points 506. The smaller the imbalance ratio 514, the greater the difference (greater the imbalance) between the first number of positive data points 504 and the second number of negative data points 506. In an example, the smaller the imbalance ratio 514 (the greater the imbalance), the larger the oversampling ratio 516.

In an embodiment of calculating the oversampling ratio 516, a production specification may be taken into account. The production specification may related to various constraints, criteria, etc. In an example, the production specification may correspond to an error margin for the estimated precision metric 510 (e.g., an allowed tolerance of the estimated precision metric 510 of the classifier 508 to be incorrect). In an example, the production specification may correspond to an error margin for the estimated recall metric 512 (e.g., an allowed tolerance of the estimated precision recall 512 of the classifier 508 to be incorrect). In an example, the production specification may correspond to a size constraint for the sample set of data points (e.g., due to the cost of editorial labeling and budget constraints), such as where a total number of data points selected for inclusion within the sample set of data points for editorial labeling is to be below a threshold amount (e.g., a minimum number of data points that still allows for adequate editorial labeling for accurately determining a prediction confidence interval for the estimated precision metric 510 and/or a recall confidence interval for the estimated recall metric 512).

Figure 5C:
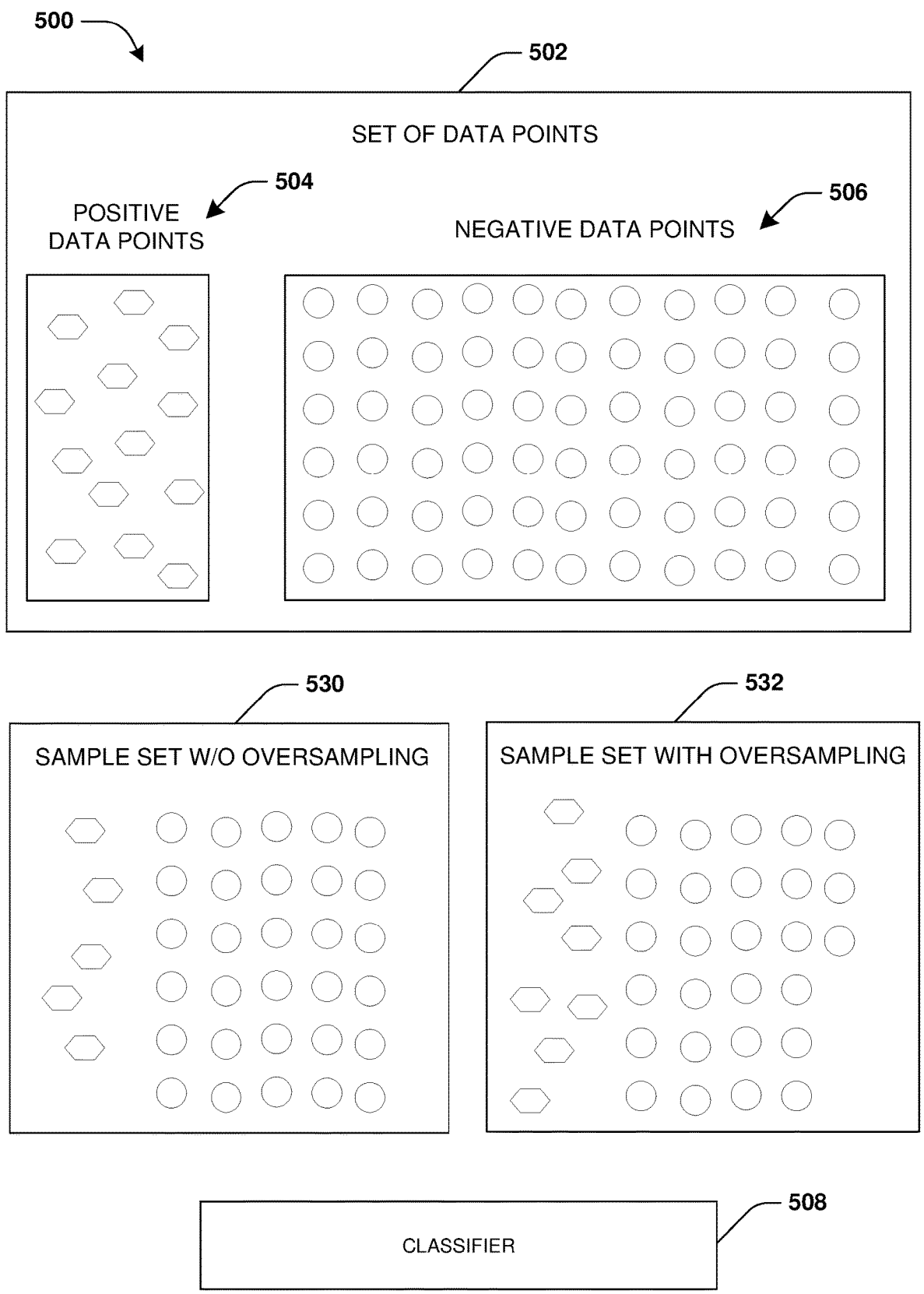
FIG. 5C is a component block diagram illustrating an example system for oversampling for imbalanced test data, where a sample set of data points is determined.

During operation 406 of method 400 of FIG. 4, a sample set of data points may be selected for editorial labeling, as illustrated by FIG. 5C. In an embodiment where the first class of positive data points 504 and the second class of negative data points 506 were determined to be balanced where the first number of positive data points 504 was not a threshold amount less than the second number of negative data points 506 (or vice versa), a sample set 530 without oversampling is determined. For example, a random sample of 35 data points may be selected from the set of data points 502 as the sample set 530 of data points without oversampling.

In an embodiment where the first class of positive data points 504 and the second class of negative data points 506 were determined to be imbalanced where the first number of positive data points 504 was a threshold amount less than the second number of negative data points 506 (or vice versa), a sample set 532 with oversampling is determined. With oversampling, the oversampling ratio 516 is used to select a certain number more of positive data points 504 for inclusion within the sample set 532 with oversampling in place of what would have been selected as negative data points 506 for inclusion within the sample set 532 with oversampling. The oversampling ratio 516 may have a multiplicative effect on what positive data points 504 would normally (e.g., using a random sampling process) be selected. For example, if a random sample of 35 data points would result in about 5 positive data points and about 30 negative data points, then about 14% of the selected data points for inclusion within the sample data set would be positive data points and around 86% of the selected data points for inclusion within the sample data set would be negative data points. If the oversampling ratio 516 is 2, then the new ratio of positive data points over negative data points would be 2*(14/86) so 28/86. In this way, the sample set 532 with oversampling now includes more positive data points than if oversampling was not perform, while still having a total number of data points below the threshold amount (e.g., still including a total of 35 data points as if randomly sampling was performed).

In an embodiment, the sample set of data points, such as the sample set 532 with oversampling, may be provided for editorial labeling to see if the classifier 508 correctly/accurately classified the data points within the sample set of data points. The results of the editorial labeling may be utilized to calculate the precision confidence interval for the estimated precision metric 510 (e.g., a plus or minus margin of error around the estimated precision metric 510) and/or a recall confidence interval for the estimated recall metric 512 (e.g., a plus or minus margin of error around the estimated recall metric 512). In an embodiment, the precision confidence interval corresponds to a confidence that the estimated precision metric 510 for the classifier 508 is correct (e.g., a plus or minus 4.3% error margin for a 75% estimated precision metric 510). If the confidence of the estimated precision metric 510 is below a threshold, then a precision distribution of precision values is generated. In an embodiment, an approximate distribution of the estimated precision metric 510 may be generated based upon at least one of a frequentists technique or a Bayesian posterior distribution technique. In an embodiment, a prediction confidence interval for the estimated precision metric 510 may be determined based upon a binominal distribution of predictive positive data.

In an embodiment, the recall confidence interval corresponds to a confidence that the estimated recall metric 512 for the classifier 508 is correct (e.g., a plus or minus 2.7% error margin for a 84% estimated recall metric 512). If the confidence of the estimated recall metric 512 is below a threshold, then a recall distribution of recall values is generated. In an embodiment, an approximate distribution of the estimated recall metric 512 may be generated based upon at least one of a frequentists technique or a Bayesian posterior distribution technique. In an embodiment, a recall confidence interval for the estimated recall metric 512 may be determined based upon two separate/individual binominal distributions of data.

In an embodiment, a simulation may be performed utilizing a bootstrap method corresponding to the precision confidence interval for the estimated precision metric 510 and/or the recall confidence interval for the estimated recall metric 512 (e.g., the bootstrap method may utilize prior data associated with the classifier 508, such as prior training data and/or metrics). In an embodiment, the simulation may utilize a Monte-Carlo method corresponding to the precision confidence interval for the estimated precision metric 510 and/or the recall confidence interval for the estimated recall metric 512.

Figure 5D:
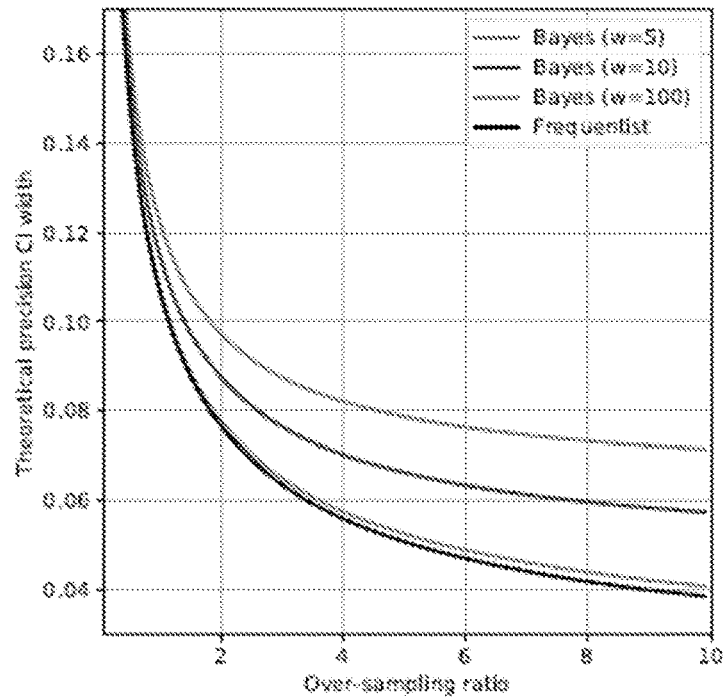
FIG. 5D is an illustration of a first graph depicting precision confidence interval widths for oversampling ratio values and a second graph depicting recall confidence interval widths for the oversampling ratio values.
Figure 5D:
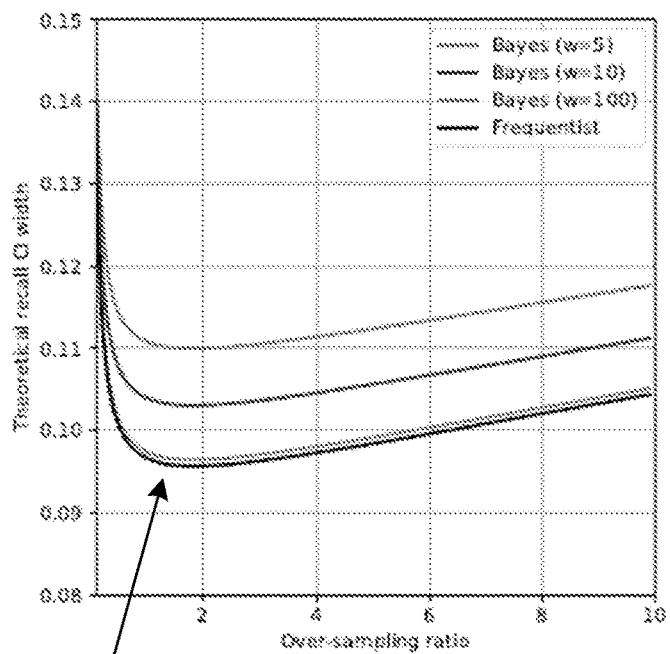

FIG. 5D illustrates a first graph 540 where precision confidence interval widths are plotted along a y axis and oversampling ratio values are plotted along an x axis. As the oversampling ratio values increase, the precision confidence interval widths decrease (e.g., a margin of error that the estimated precision metric 510 is incorrect shrinks, and thus the estimated precision metric 510 is deemed to be more accurate), which means that the confidence that the estimated precision metric 510 is correct increases as a larger number of positive data points 504 are oversampled. FIG. 5D illustrates a second graph 542 where recall confidence interval widths are plotted along a y axis and oversampling ratio values are plotted along an x axis. Initially, as the oversampling ratio values increase, the recall confidence interval widths decrease until a point 544 (e.g., a margin of error that the estimated recall metric 512 is incorrect shrinks up to point 544, and thus the estimated recall metric 512 is deemed to be more accurate), and then the recall confidence interval widths increase. The point 544 may be a minimum point where the recall confidence interval width is at a minimum value (e.g., a margin of error that the estimated recall metric 512 is incorrect is at a minimum value), which means that the confidence that the estimated recall metric 512 is correct is at a maximum value. In an embodiment, the oversampling ratio 516 may be selected as the point 544 (e.g., about 1.75) because the recall confidence interval width is at the minimum value and the precision confidence interval width is at a decreased value than if no oversampling was performed. In an embodiment, other values may be selected as the oversampling ratio 516 such as 2, 2.2, or any other value because the precision confidence interval width decreases as the value of the oversampling ratio 516 increases and there may be some tolerance for the recall confidence interval width increasing past point 544. In this way, the oversampling ratio 516 may be determined for selecting the sample set of data points for editorial labeling.

Figure 6:
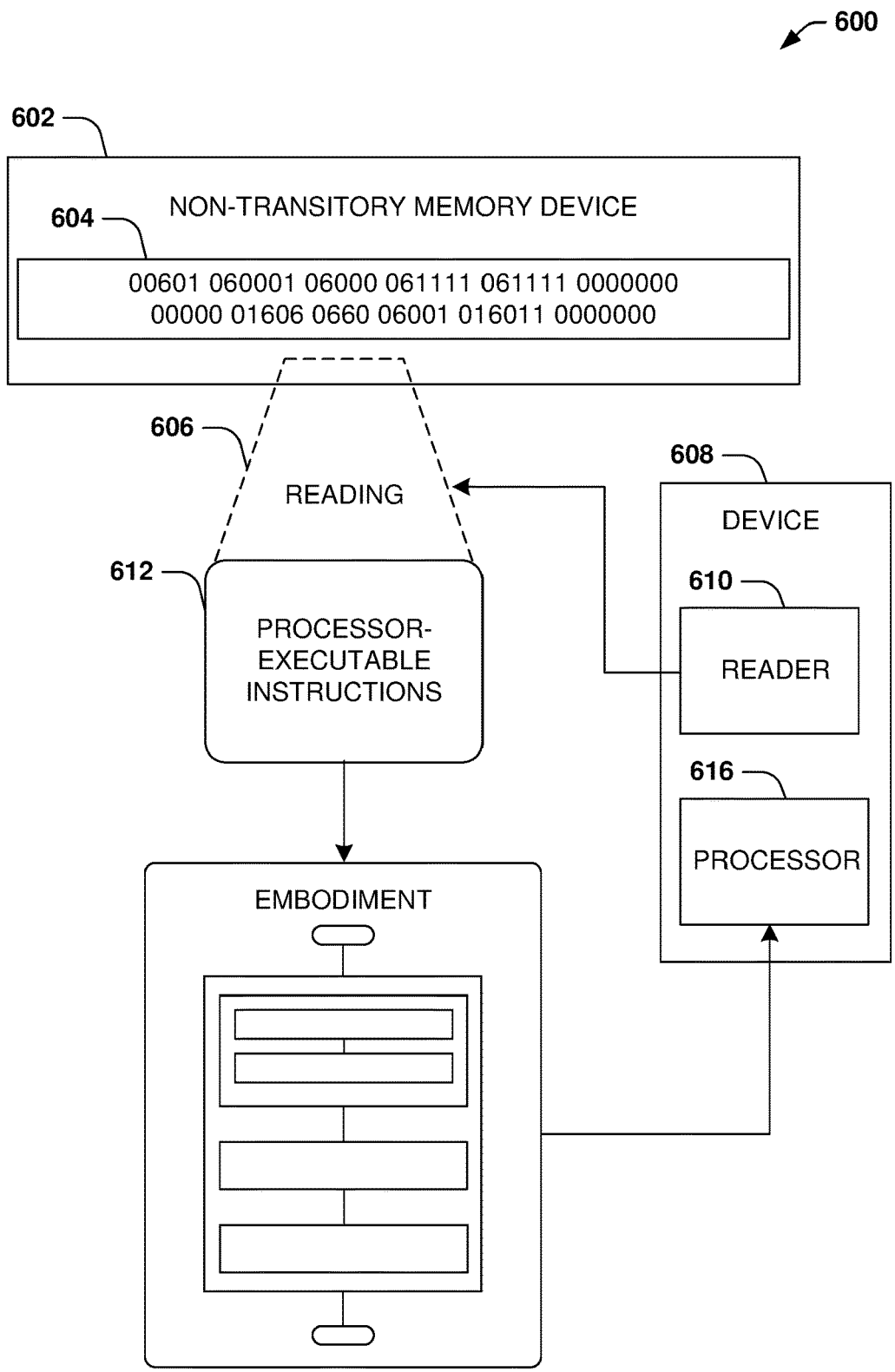
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 500 of FIG. 5A-5C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
  executing, on a processor of a computing device, instructions that cause the computing device to perform operations, the operations comprising:
    configuring a classifier to classify data points as either belonging to a first class or a second class;
    in response to determining that the first class and the second class are imbalanced where a first number of data points estimated to be part of the first class is a threshold amount less than a second number of data points estimated to be part of the second class, determining an oversampling ratio for the first class; and
    selecting, based upon the oversampling ratio, a sample set of data points for editorial labeling comprising a selected number of data points estimated to be part of the first class and a selected number of data points estimated to be part of the second class, wherein the sample set of data points comprises a total number of data points below a threshold amount.

2. The method of claim 1, comprising:
determining the oversampling ratio based upon an imbalance ratio between the first class and the second class.

3. The method of claim 2, comprising:
determining the imbalance ratio based upon a ratio of the first number of data points and the second number of data points.

4. The method of claim 1, comprising:
determining the oversampling ratio based a production specification.

5. The method of claim 4, wherein the production specification corresponds to an error margin for a precision metric.

6. The method of claim 4, wherein the production specification corresponds to an error margin for a recall metric.

7. The method of claim 1, comprising
determining a precision confidence interval corresponding to a confidence that a precision metric for the classifier is correct.

8. The method of claim 7, comprising:
in response to determining that a confidence of the precision confidence interval being correct is below a threshold, generating a precision distribution.

9. The method of claim 1, comprising
determining a recall confidence interval corresponding to a confidence that a recall metric for the classifier is correct.

10. The method of claim 9, comprising:
in response to determining that a confidence of the recall confidence interval being correct is below a threshold, generating a recall distribution.

11. The method of claim 1, comprising:
generating an approximate distribution of a precision metric based upon at least one of a frequentists technique or a Bayesian posterior distribution technique.

12. The method of claim 1, comprising:
generating an approximate distribution of a recall metric based upon at least one of a frequentists technique or a Bayesian posterior distribution technique.

13. A non-transitory machine readable medium having stored thereon processor-executable instructions that when executed cause performance of operations, the operations comprising:
identifying a first class and a second class of data points that are classified by a classifier;
in response to determining that the first class and the second class are imbalanced where a first number of data points estimated to be part of the first class is a threshold amount less than a second number of data points estimated to be part of the second class, determining an oversampling ratio for the first class; and
selecting, based upon the oversampling ratio, a sample set of data points for editorial labeling comprising a selected number of data points estimated to be part of the first class and a selected number of data points estimated to be part of the second class, wherein the sample set of data points comprises a total number of data points below a threshold amount.

14. The non-transitory machine readable medium of claim 13, wherein the operations comprise:
performing a simulation utilizing a bootstrap method corresponding to confidence intervals associated with a precision metric and a recall metric.

15. The non-transitory machine readable medium of claim 13, wherein the operations comprise:
performing a simulation utilizing a Monte-Carlo method corresponding to confidence intervals associated with a precision metric and a recall metric.

16. A computing device comprising:
a processor; and
memory comprising processor-executable instructions that when executed by the processor cause performance of operations, the operations comprising:
determining that a first class and a second class of data points classified by a classifier are imbalanced where a first number of data points estimated to be part of the first class is a threshold amount less than a second number of data points estimated to be part of the second class,
calculating an oversampling ratio for the first class; and
selecting, based upon the oversampling ratio, a sample set of data points for editorial labeling comprising a selected number of data points estimated to be part of the first class and a selected number of data points estimated to be part of the second class, wherein the sample set of data points comprises a total number of data points below a threshold amount.

17. The computing device of claim 16, wherein the operations comprise:
determining a prediction confidence interval for a precision metric based upon a binominal distribution of predictive positive data.

* * * * *